United States Patent Office

3,488,717
Patented Jan. 6, 1970

3,488,717
CHEMICAL PRECIPITATION AND FLOCCULATION
Ronald F. Wukasch and Robert D. Goodenough, Midland, Mich., assignors to The Dow Chemical Company, Midland, Mich., a corporation of Delaware
No Drawing. Filed Aug. 22, 1967, Ser. No. 662,301
Int. Cl. B01d 21/01
U.S. Cl. 210—53          8 Claims

ABSTRACT OF THE DISCLOSURE

Aqueous wastes are treated with soluble ferrous ion and, after intervening mixing, a strong base is added to flocculate suspended solids in the waste and render the waste more amendable to solids-liquid separatory techniques such as settling, centrifugation and filtration. An important feature of the process is its capability for reducing the total phosphate in the clarified effluent. Only small amounts of a ferrous iron and base are used. The amount of iron used will be less than 100 parts per million, based on total weight. Good results are achieved by using less than 50 parts per million. The amount of base added should be within the range from about 10 to 130 percent of that amount chemically equivalent to the ferrous iron added.

---

In recent years, the removal of phosphates from aqueous wastes such as municipal and industrial sewages has become a principal objective for waste treatment processes. The removal of phosphates is highly desired because of their nutritive value to aquatic plants, which can clog and generally render undesirable natural water courses.

It would be desirable, and it is an object of the instant invention to provide a new process which renders solids in aqueous wastes more amendable to separation as by settling, centrifugation and filtration, and which process also reduces phosphates in the clarified effluent. In particular, it is the purpose of the invention to provide a waste treatment process which can be readily adapted to existing sewage treatment facilities.

The foregoing and other benefits, as will become apparent hereinafter, are achieved in a process comprising incorporating water-soluble ferrous ion into an aqueous waste and, after some intervening mixing, adding a strong base. The extent of intervening mixing is not critical. Mixing on the order of a few seconds is satisfactory. Preferably, intervening mixing will be optimized in the range from about 0.1 up to 20 minutes. Longer times can be used but generally will be without additional advantage.

A further important parameter of the invention is the amount of the chemicals used. The amount of soluble ferrous ion, which may be supplied in the form of any water-soluble ferrous compound ionizeable in water solution to yield ferrous ions, will be generally less than about 100 parts per million of iron based on the weight of sewage treated. Good results, and often optimum results, will be achieved utilizing from about 10 up to about 50 parts per million by weight of iron. The amount of strong base will vary for effective results within the range from about 10 up to about 130 percent of that amount of the base which is chemically equivalent to the amount of iron used. For instance, at a 100 percent equivalence ratio, 1.43 grams of sodium hydroxide will be added for each 1.0 gram of ferrous ion. At the same ratio, 1.33 grams of calcium hydroxide will be added for each gram of ferrous ion.

The above invention is believed to be differentiated from the prior art in the combination of parameters specifying the usage of small amounts of ferrous ion and a strong base, particularly with intervening mixing. Each of these materials has been proposed for use in waste treatment processes. Moreover, it is known that the soluble ferrous iron precipitates soluble phosphates from aqueous solution. However, in the instant invention it has been discovered, as will be shown in the subsequent examples, that the combination treatment, utilizing the ferrous iron and base in the critical sequence specified, and in the amounts indicated, are essential to the efficient recovery of total phosphates from aqueous wastes. The data also shows the achievement of good clarification, primarily as a result of more efficient flocculation of suspended solids.

In the practice of the invention, the amount of ferrous ion used and dosing of strong base may be programmed at any level or schedule desired within the aforementioned limits. However, preferred practice will be to use an amount of iron which relates to the average amount of phosphate in the aqueous waste being treated. Thus, it is preferred to adjust the amount of iron utilized within the range from about 0.5 up to about 2.0 parts by weight thereof per part by weight of phosphate present in the aqueous waste, as determined according to a standard method for analysis of total phosphates in aqueous wastes.

Having ascertained the average amount of phosphate present in the waste to be treated, or otherwise arbitrarily set a dosage level for the iron additive, any ferrous iron compound which yields soluble ferrous ions in solution is added to the waste, preferably with mixing to induce rapid dispersion of the iron. Suitable ferrous compounds include for example ferrous chloride, ferrous sulfate and ferrous nitrate. An adequate dispersion of the ferrous ion throughout the waste can be achieved nearly instantaneously, i.e. within a few seconds with efficient mixing devices. Longer initial agitation times from 0.1 up to 20 minutes are usually beneficial.

Following the addition of soluble ferrous ion with agitation, a strong base, which may be any basic material yielding a pH of at least 10.6 at 0.5 molar concentration in water, is added. Such basic materials include the alkali metal hydroxides and carbonates. In addition, water-soluble alkaline earth metal oxides and hydroxides such as lime, calcium hydroxide, magnesium hydroxide and the like can be used. For best results, the soluble ferrous iron compound and strong base are incorporated into the aqueous waste in the form of dilute aqueous solutions.

The uniqueness of the instant invention and the advantages to be gained in the practice thereof are illustrated by the following examples.

EXAMPLES

A sample of a domestic sewage from a midwestern city was analyzed for its phosphate content. Since the particular sewage selected contained a rather low amount of soluble phosphate, i.e. 3.7 parts per million calculated as orthophosphate, sufficient dipotassium monohydrogen phosphate solution was added to give the sewage a total of 14.8 parts per million by weight of soluble ortho phosphate. The total phosphate content, i.e. including insoluble phosphates as well as the soluble phosphate, was found to be 26.8 parts per million.

Individual one liter aliquots of the sewage with adjusted phosphate content were subjected to varying treatments with ferrous chloride in a water solution containing 10 milligrams of ferrous ion per milliliter and 0.1 N sodium hydroxide. Initially each sewage aliquot was subjected to agitation with a paddle stirrer rotating at about 80 r.p.m. Ferrous chloride was then added and the treated suspension stirred for 15 minutes. The sodium hydroxide was added next and stirring continued for 45 minutes at about 40 r.p.m. Agitation was then stopped and settling allowed to proceed for 30 minutes.

The resulting clarified supernatant was sampled and analyzed for soluble and total phosphate. The results of these runs are set forth in the following Table I along with data on the amounts of ferrous chloride and sodium hydroxide utilized.

TABLE I

| Aliquot No.: | Fe++ (10 mg./ml.) | NaOH (0.1 normal), ml. | NaOH/FeCl₂ equivalence,[1] percent | pH Natural sewage | pH after FeCl₂ | pH Final | Soluble PO₄, p.p.m. | Total PO₄, p.p.m. |
|---|---|---|---|---|---|---|---|---|
| Control | | | | 7.35 | | | 14.8 | 26.8 |
| 1 | 2 | 0 | 0 | 7.35 | | 7.05 | 3.7 | 8.3 |
| 2 | 2 | 1.79 | 25 | 7.40 | 7.0 | 7.20 | 2.5 | 6.5 |
| 3 | 2 | 3.58 | 50 | 7.40 | 6.9 | 7.45 | 1.6 | 4.4 |
| 4 | 2 | 5.37 | 75 | 7.45 | 6.95 | 7.80 | 1.5 | 3.7 |
| 5 | 2 | 7.17 | 100 | 7.50 | 6.95 | 8.10 | 2.2 | 4.1 |

[1] The chemical equivalence ratio of NaOH to FeCl₂ assumes the following reaction: FeCl₂ plus 2NaOH ⇌ Fe(OH)₂ plus 2NaCl.

For the purposes of comparison, a second series was run in a manner similar to the foregoing except that the caustic and ferrous chloride were pre-mixed prior to addition to the sewage. Agitation to induce flocculation was continued for one hour after and then settling allowed to proceed for 30 minutes. The comparative results are set forth in the following Table II.

TABLE II

| Aliquot No. | Fe++ (10 mb./ml.) | NaOH (0.1 normal), ml. | NaOH/FeCl₂ equivalence[1] percent | pH Natural sewage | pH Final | Soluble PO⁴, p.p.m. | Total PO⁴, p.p.m. |
|---|---|---|---|---|---|---|---|
| Control | | | | 7.4 | | 14.9 | 26.4 |
| 1 | 2 | 0 | 0 | 7.4 | 7.1 | 3.3 | 9.0 |
| 2 | 2 | 1.79 | 25 | 7.5 | 7.25 | 2.9 | 8.5 |
| 3 | 2 | 3.59 | 50 | 7.5 | 7.40 | 5.0 | 10.3 |
| 4 | 2 | 5.37 | 75 | 7.5 | 7.55 | 9.2 | 14.7 |
| 5 | 2 | 7.17 | 100 | 7.5 | 7.65 | 11.0 | 17.0 |

[1] The chemical equivalence ratio of NaOH to FeCl₂ assumes the following reaction: FeCl₂ plus NaOH ⇌ Fe(OH)₂ plus 2NaCl.

A comparison of the results set forth in Tables I and II above illustrates the critical importance of the specified order of addition for the ferrous ion and the basic material. Both the soluble and total phosphate contents of the waste were reduced to desirably low levels in the data of Table I. The soluble phosphates are apparently efficiently precipitated and the insoluble phosphates rendered more amendable to separation with the use of the specified sequential addition of the reagents. The data of Table II illustrates the poor results obtained when the soluble ferrous salt and base are added simultaneously. Similarly poor results are obtained when the base is added before the ferrous salt.

In a manner similar to that employed in obtaining the data of Table I, similar improvements in the separation of phosphates have been achieved employing calcium hydroxide and sodium carbonate as well as caustic. The particular waste treated was a raw sewage obtained from another midwestern city containing approximately 3 parts per million of soluble phosphates and 21 parts per million of total phosphates. Ferrous chloride was dosed to provide 20 parts per million of iron and after 30 seconds of rapid stirring a strong base was added. Each of the strong bases was employed at dose levels of 30 and 45 parts per million expressed as CaCO₃. The results of these runs are set forth in the following Table III.

TABLE III

| | | Aliquot No. | | | | | | |
|---|---|---|---|---|---|---|---|---|
| | Control | 1 | 2 | 3 | 4 | 5 | 6 | 7 |
| Conditions: | | | | | | | | |
| FeCl₂ (mg./l. as Fe) | 0 | 20 | 20 | 20 | 20 | 20 | 20 | 20 |
| NaOH (mg./l. as CaCO₃) | | | 30 | 45 | | | | |
| Ca(OH)₂ (mg./l. as CaCO₃) | | | | | 30 | 45 | | |
| Na₂CO₃ (mg./l. as CaCO₃) | | | | | | | 30 | 45 |
| Effluent Quality: | | | | | | | | |
| Final pH | 7.2 | 7.1 | 7.2 | 7.4 | 7.3 | 7.4 | 7.2 | 7.2 |
| Final turbidity | >200 | 28 | 16 | 15 | 19 | 20 | 25 | 25 |
| Soluble O, PO₄ | 3.0 | 1.0 | 0.5 | 0.7 | 0.4 | 0.5 | 0.5 | 0.3 |
| Total, PO₄ | 21.0 | 5.1 | 1.3 | 1.1 | 1.0 | 1.0 | 2.0 | 1.5 |
| Percent Total, PO₄ removed | | 75.7 | 93.8 | 94.7 | 95.2 | 95.2 | 90.5 | 92.8 |
| Total, Fe content | 7.5 | 21.5 | 3.6 | 3.1 | 2.6 | 2.6 | 3.2 | 2.7 |

The above data illustrates two further aspects of the instant invention in addition to the excellent separation of phosphates. It will be noted the turbidity of the supernatant was significantly reduced upon the addition of the strong base. Similarly, iron residuals were significantly reduced by the addition of the base.

Waste systems to which the above process is generally applicable include both industrial and municipal sewages. In general, any aqueous dispersion of organic solids at a pH within the range of about 6 to about 8 can be effectively treated in accordance with the invention.

The flocculation and settling of the waste system can be further enhanced with the use of a water-soluble organic polymeric flocculant. For example, high molecular weight, anionic organic polymers, such as alkali metal salts of polystyrene sulfonates and acrylamide-acrylate copolymers have been used to increase flocculation and settling rates in wastes treated in accordance with the invention. In addition, the efficiency of solids separation may be improved with the use of cationic and nonionic polymeric flocculants such as polyethylenimine, polyethyleneamines, polyaminoethylacrylates, poly-N-aminoethyl acrylamide, polyvinyl alcohol, polyethylene oxide and the like.

What is claimed is:
1. In a process for the clarification of an aqueous organic waste which comprises subjecting the waste to flocculating conditions and separating suspended solids from the aqueous phase, the improvement which consists in adding a soluble ferrous salt in an amount to provide from 0.5 to 2.0 parts by weight of iron per part by weight of phosphate in said waste, with mixing, and thereafter adding a strong base in an amount of from 10 percent to

130 percent of that amount which is chemically equivalent to the amount of iron added whereby the phosphate content of the waste is reduced without increase in the iron content thereof.

2. A method as in claim 1 wherein the amount of ferrous salt added is less than about 100 parts per million based on the weight of waste treated and the amount of base added is within the range from about 10 to 130 percent of that amount which is chemically equivalent to the amount of iron added.

3. A method as in claim 1 wherein the strong base is sodium hydroxide.

4. A method as in claim 1 wherein the strong base is sodium carbonate.

5. A method as in claim 1 wherein the strong base is lime.

6. A method as in claim 3 wherein ferrous salt is added in an amount within the range from about 10 up to about 50 parts per million based on the total weight of waste treated and sodium hydroxide is added in an amount within the range from about 10 to 130 percent of that amount of sodium hydroxide which is chemically equivalent to the ferrous salt added.

7. A method as in claim 1 wherein the aqueous waste is a municipal sewage.

8. A method as in claim 1 and including the additional step of flocculating the aqueous waste with a water-soluble, polymeric flocculant.

References Cited

UNITED STATES PATENTS

| | | | |
|---|---|---|---|
| 2,810,633 | 10/1967 | Cooper | 210—53 X |
| 3,386,910 | 6/1968 | Forrest | 210—11 X |
| 3,171,805 | 3/1965 | Suen et al. | 210—54 |
| 3,183,186 | 5/1965 | Oster | 210—52 |

FOREIGN PATENTS 11,111    1900    Great Britain

OTHER REFERENCES

Report of Committee of American Public Health Assn., "Chemical Treatment of Sewage," Sewage Works Journal, vol. 7, November 1935, pp. 1007–1011.

Groen, M. A.: The use of steel pickling for sewage sludge conditioning, Sewage Works Journal, vol. 21, November 1949, pp. 1937–1049 (P.O.S.L.).

MICHAEL E. ROGERS, Primary Examiner